United States Patent [19]
Frazier

[11] Patent Number: 5,673,969
[45] Date of Patent: Oct. 7, 1997

[54] CHILD RESTRAINT SEAT ASSEMBLY

[75] Inventor: David Keith Frazier, Florence, Ala.

[73] Assignee: Frazier Innovations, Inc., Florence, Ala.

[21] Appl. No.: 601,447

[22] Filed: Feb. 14, 1996

[51] Int. Cl.[6] .................................................. A47C 1/08
[52] U.S. Cl. ............................ 297/256.15; 297/256.16
[58] Field of Search ........................ 297/250.1, 216.11, 297/216.1, 254–256, 256.15, 256.16, 487, 488, 467, 233, 239, 4

[56] References Cited

U.S. PATENT DOCUMENTS

| | | | |
|---|---|---|---|
| 2,195,334 | 3/1940 | Lethern | 244/122 |
| 2,481,382 | 9/1949 | Bennett | 297/254 X |
| 2,947,350 | 8/1960 | Davis | 297/467 X |
| 3,428,029 | 2/1969 | Klickstein et al. | 119/96 |
| 4,025,111 | 5/1977 | Tanaka et al. | 297/390 |
| 4,063,778 | 12/1977 | Chika | 297/389 |
| 4,099,770 | 7/1978 | Elsholz et al. | 297/216 |
| 4,367,829 | 1/1983 | Kusz . | |
| 4,540,218 | 9/1985 | Thomas | 297/467 |
| 4,688,849 | 8/1987 | Tsuge et al. | 297/256.15 |
| 4,750,783 | 6/1988 | Irby et al. | 297/256.16 |
| 4,759,588 | 7/1988 | Husnik | 297/250.1 X |
| 4,768,828 | 9/1988 | Kohketsu | 297/250.1 |
| 4,867,464 | 9/1989 | Cook | 280/33.993 |
| 4,871,210 | 10/1989 | Alexander et al. | 297/435 |
| 5,061,012 | 10/1991 | Parker et al. | 297/256.15 X |
| 5,228,746 | 7/1993 | Burleigh | 297/250.1 |
| 5,259,338 | 11/1993 | Cornell | 119/770 |
| 5,294,182 | 3/1994 | Colasanti | 297/467 |
| 5,385,386 | 1/1995 | Beamish et al. | 297/256.16 |
| 5,435,272 | 7/1995 | Epstein | 119/770 |
| 5,468,020 | 11/1995 | Scime | 297/216.11 X |

*Primary Examiner*—Milton Nelson, Jr.
*Attorney, Agent, or Firm*—Gifford, Krass, Groh, Sprinkle, Patmore, Anderson & Citkowski, P.C.

[57] ABSTRACT

A child restraint seat assembly is provided for use in securing a child within a safety seat which is secured to the seat belt of a seated adult. The adult is a seated passenger in an airplane, or other type of vehicle in which it is desirable to keep the child on the lap of the adult. The child restraint seat assembly includes a seat having a bottom and a back, the bottom having a front end and a rear end, and the back having a top end and a bottom end. The bottom end of the back is joined to the rear end of the bottom. Additionally, the child restraint seat assembly includes at least one elongated strap adapted to secure the body of a child to the seat. This strap further includes a plate attached to the strap which can be removably attached to a plate receiving member attached to a post. The post is secured to the front end of the bottom of the seat assembly. The plate receiving member further includes a plate release. Additionally, the seat assembly is removably attached to a seat belt worn by a seated adult by a loop attached to the post, the loop being adapted to slidably engage the seat belt therethrough. The loop further includes a hinged portion so that the seat assembly can be removed from the seat belt while the seat belt is still secured around the seated adult.

22 Claims, 2 Drawing Sheets

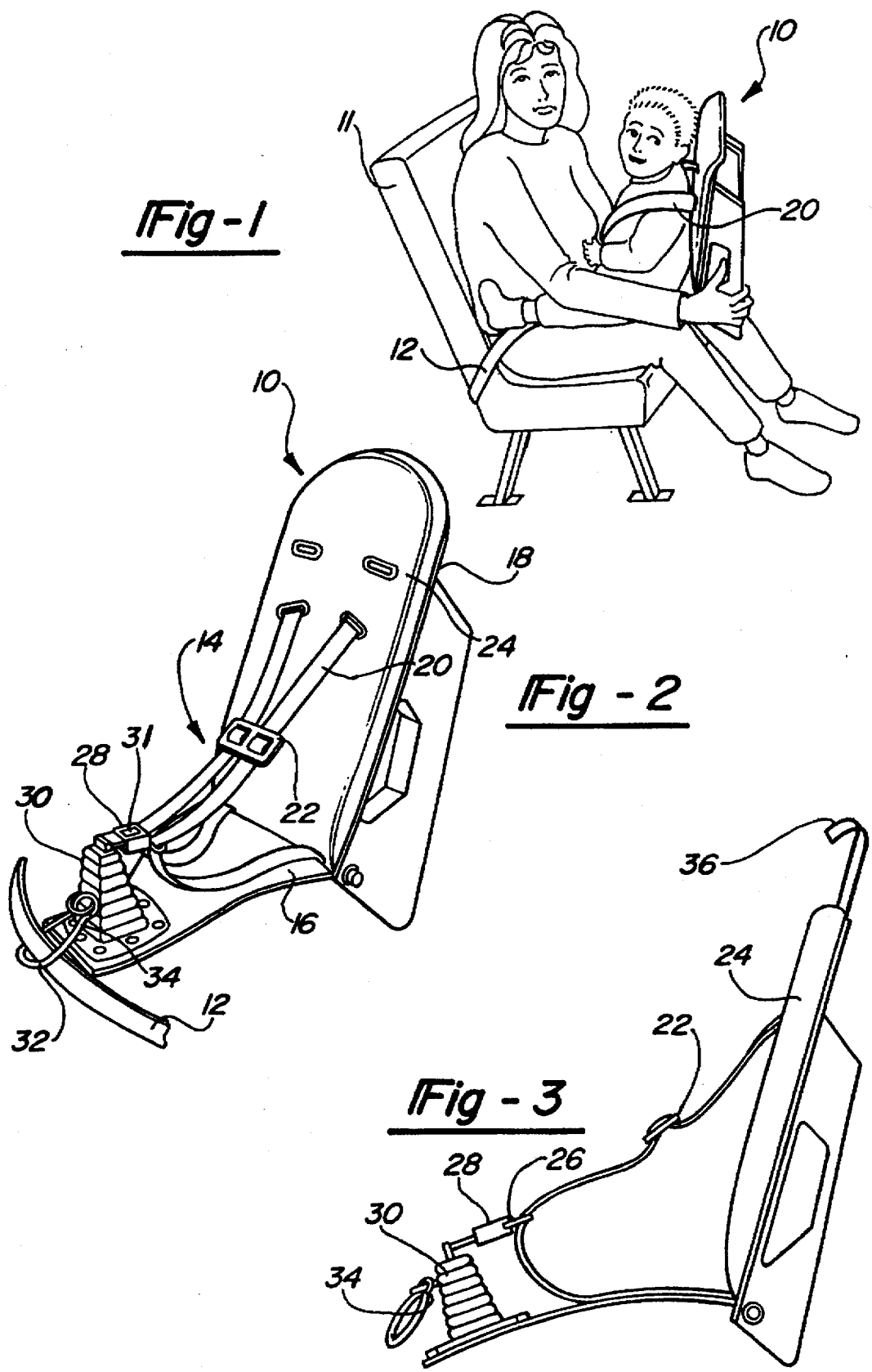

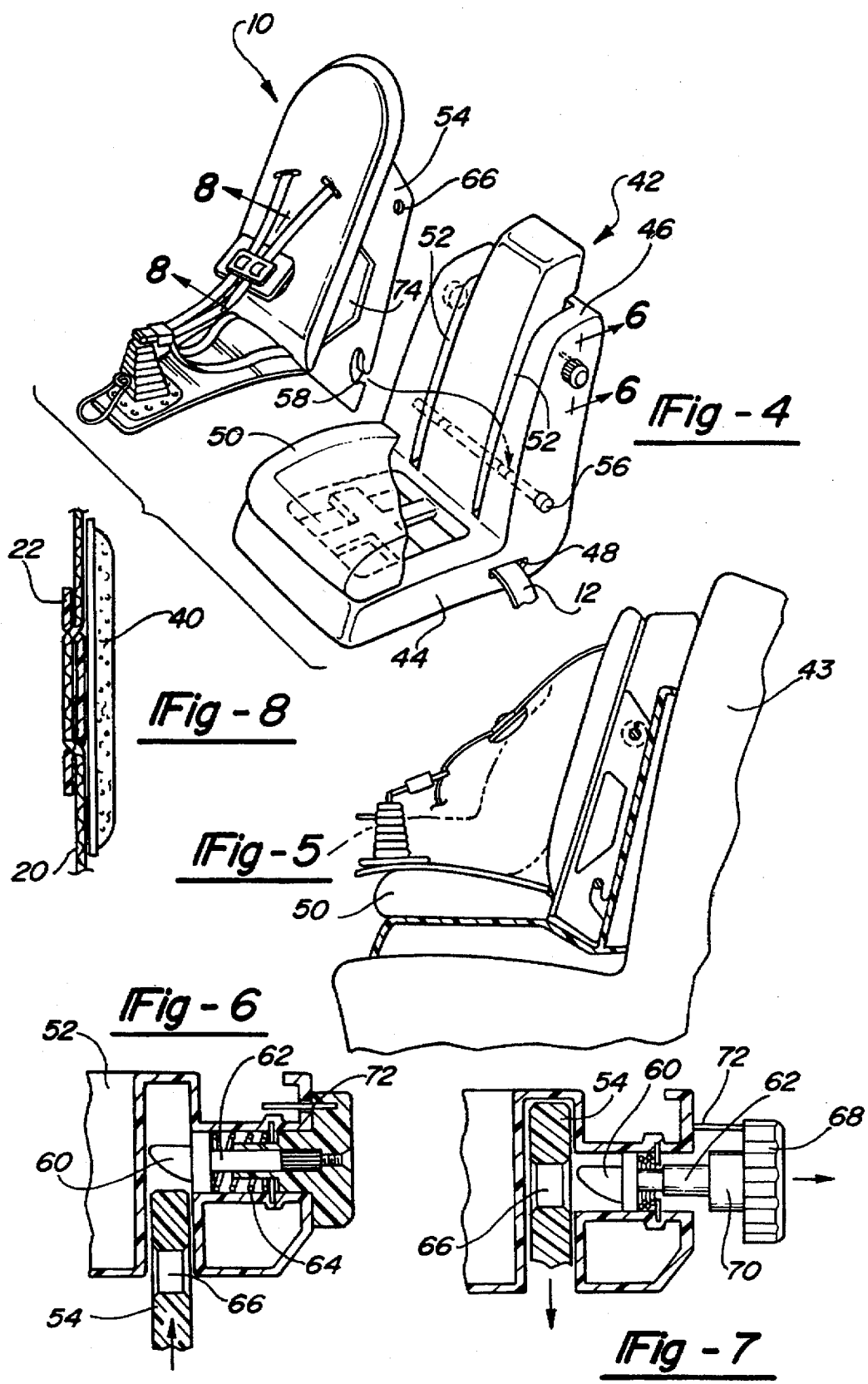

5,673,969

CHILD RESTRAINT SEAT ASSEMBLY

BACKGROUND OF THE INVENTION

I. Field of the Invention

The present invention relates generally to child restraint seats and, more particularly, to a child restraint seat assembly which can be attached to the seat belt of a seated adult.

II. Description of the Prior Art

Child restraint seats are a convenient and safe way to transport children, particularly in automobiles. In a typical child safety seat, a child is secured within the seat, which is then secured within the vehicle. In the event of a crash, the child is far less likely to sustain injuries if secured within a safety seat, than if merely carried in the lap of an adult passenger. Carrying a child in the lap of a seated passenger was a common form of transporting children in vehicles prior to the advent of a widespread usage of car seats.

One significant disadvantage of these previously known child safety seats is that they require a separate seat, or a separate space on a seat to which they are attached. Therefore, these conventional seats are oftentimes impractical and unusable in crowded seating situations, or in situations in which separate seats must be additionally purchased. Such situations, of course, include subways, trains, buses, and especially airplanes. A separate space or seat is oftentimes simply not available in these alternative modes of transportation.

In the airline industry, current practice allows children under the age of 2 to fly free if they are seated in the lap of an adult passenger. These children are referred to by the airlines as "lap babies". These "lap babies" are held in place by nothing more than the arms of their parents, or the adult passenger with whom they are seated. In the event of an airplane crash, airlines advise adult passengers to place the lap babies in the aisle of the airplane. Whether held in the arms of an adult passenger, or placed in the aisle of the airplane, these "lap babies" are at enormous risk of death or serious bodily harm in the event of an airplane crash or emergency landing.

A parent or adult passenger of a child under the age of 2 must then face the dilemma of either carrying the infant on the adult's lap, and thereby compromising the child's safety, or purchasing an entirely separate seat for a conventional safety seat, thereby greatly adding to the expense of flying with young children.

U.S. Pat. No. 4,099,770 discloses a safety device for automobile occupants. The device has two straps for extending over the occupant's shoulders with the two straps being combined in superimposed relation a distance behind and substantially above the shoulders of the occupant. A first securing arrangement is provided for coupling the combined straps to a portion of the vehicle and a second securing arrangement is provided which is securable to at least one portion of the vehicle and extends along at least a portion of the width of the vehicle seat.

U.S. Pat. No. 4,867,464 discloses a child restraining safety belt or harness. The device restrains very small children to a shopping cart seat and also serves as a harness when the child is not seated in the seat. A middle strap member overlies the child's stomach and wraps around part of the back of a shopping cart seat. The opposite ends of the middle strap member are releasably fastened together behind the child's back. A tether member is secured to the device to harness the child when the child is not in the shopping cart seat.

However, none of the prior art devices disclose a device for securely maintaining a child in the lap of a seated adult.

SUMMARY OF THE PRESENT INVENTION

The present invention provides a child restraint seat assembly which overcomes all of the above-mentioned disadvantages of the previously known devices.

In brief, the child restraint seat assembly of the present invention comprises a seat having a bottom and a back, the bottom having a front end and a rear end, and the back having a top end and a bottom end. The bottom end of the back is joined to the rear end of the bottom. Additionally, the child restraint seat assembly includes means attached to the seat for removably securing a child within the seat, and means secured to the seat for removably attaching the seat to a seat belt.

The child restraint seat assembly further includes at least one elongated strap adapted to secure the body of a child to the seat, the strap further comprising means for removably attaching a portion of the strap to a post attached to the front end of the bottom of the seat.

In a preferred embodiment of the invention, the bottom of the seat is made of a flexible material, while the back of the seat is made of a rigid material. The strap which secures the child within the seat can be removably attached from the post by means of a plate attached to the strap and a plate receiving member attached to the post. The plate receiving member further includes plate release means.

In a preferred embodiment of the invention, the seat assembly is removably attached to a seat belt worn by a seated adult by means of a loop attached to the post, the loop adapted to slidably engage the seat belt therethrough.

BRIEF DESCRIPTION OF THE DRAWINGS

A better understanding of the present invention will be had upon reference to the following detailed description, when read in conjunction with the throughout the several views, and in which: accompanying drawings, wherein like reference characters refer to like parts FIG. 1 is an environmental view of the child restraint seat assembly of the present invention;

FIG. 2 is a perspective view of the child restraint seat assembly of the present invention;

FIG. 3 is a side view of the child restraint seat assembly of the present invention;

FIG. 4 is a perspective view of an alternate embodiment of the present invention;

FIG. 5 is a side view of an alternate embodiment of the present invention;

FIG. 6 is a first detailed view of the locking portion of the alternate embodiment of the present invention, taken along lines 6—6 of FIG. 4;

FIG. 7 is a second detailed view of the locking portion of the alternate embodiment of the present invention; and FIG. 8 is a detailed view of the chest protector of the present invention taken along lines 8—8 of FIG. 4.

DETAILED DESCRIPTION OF A PREFERRED EMBODIMENT OF THE PRESENT INVENTION

With reference to FIGS. 1 through 3, a preferred embodiment of the child restraint seat assembly 10 of the present invention is there shown. As is best shown in FIG. 1, a child is secured within the child restraint seat assembly 10 which is placed on the lap of a seated adult. The adult is seated in a vehicle, such as an airplane seat 11. The adult is secured within the seat 11 by a conventional seat belt 12. The seat assembly 10 is secured to the seat belt 12 of the adult passenger.

With reference now to FIGS. 2 and 3, the seat assembly 10 is there shown in greater detail and includes a seat 14 having a bottom 16 and a back 18. The bottom end of the back 18 is joined to the rear end of the bottom 16.

In a preferred embodiment, the seat assembly 10 has a plurality of straps 20 for securing the child within the seat 14. In a preferred embodiment, the straps 20 are configured in a four point harness system in which two straps 20 extend across the shoulders of the child and two straps 20 extend across the abdomen of the child. The straps 20 can further include slip rings 22 for adjusting the length of the straps 20 around the child so as to secure the child snugly, but comfortably within the seat 14. Preferably, the straps 20 can be constructed of a rigid cloth material. As best shown in FIGS. 4 and 8, a padded chest protector 40 can be attached to the slip rings 22 or another portion of the straps 20 to further protect the child during impact.

The back 18 of the seat assembly 10 is preferably constructed of a rigid material, such as rigid plastic. The rigid material will help support the child's head and neck in the event of an airplane or other type of vehicle crash, or other type of unsafe situation. In order to make the back 18 more comfortable, the back 18 can be overlaid with a padded layer 24.

The bottom 16 of the seat assembly 10 is preferably made of a flexible material such as a webbed pliable plastic. This serves to increase the comfort for the lap portion of the seated adult.

In the preferred embodiment, the straps 20 are attached to a plate 26 which can be removably inserted into a plate receiving means 28 which is attached to a post 30. The plate receiving means 28 further includes a plate release button 31, which when depressed, will release the plate 26 from the plate receiving member 28. In this fashion, the straps 20 can be removed from around the child, and the child can be removed from the seat assembly 10. The post 30 is attached to a front portion of the seat bottom 16 and fits between the child's legs when the child is secured within the seat assembly 10. In use, the straps 20 of the seat assembly are placed around the shoulders and abdomen of the child. The plate 26 is then lockingly engaged within the plate receiving member 28. The plate 26 can be removed by depressing the plate release means 30.

As best shown in FIGS. 2 and 3, the seat assembly 10 also includes a loop 32 attached to the post 30. When in use, the seat belt 12 of the seated adult is passed through the loop 32 of the seat assembly 10 and then secured across the abdomen of the seated adult in conventional fashion, as is known in the art. In a preferred embodiment, the loop 32 further includes a hinged portion 34 which, when depressed, provides an opening for the seat belt 12. In this way, the seat assembly 10 can be detached from the seat belt 12 of the seated adult, without unfastening the seat belt 12. In an alternate embodiment, the loop 32 can be attached to the back 18 of the seat 14 (not shown) for situations when the child must face away from the seated adult. In these situations, the chest protector 40 provides added protection in the event of the child being thrust forward.

As best shown in FIG. 3, the child restraint seat assembly 10 of the present invention can also include a roll bar 36 which protects the head of the child from objects falling from the overhead bin of an airplane. Additionally, the seat assembly 10 can be made of a floatable material so that the child can float within the seat assembly 10 in the event of a water landing or airplane crash over water. In a preferred embodiment, the chest protector 40 can be made of a material more buoyant than the rest of the seat assembly 10 so that when floating, the child's head will remain above water. Portions of the seat assembly 10 can be made reflective so that the child within the seat assembly 10 can be easily found in dark, or dimly lit conditions.

As best shown in FIGS. 4–7, in an alternative embodiment, the seat assembly 10 of the present invention can be adapted to fit into a receptacle 42 thereby converting it for use as a conventional vehicle safety seat. The receptacle 42 has a bottom 44 and a back 46, the bottom 44 further including a slot 48 adapted to receive a seat belt 12 therethrough. This serves to attach the receptacle 42 to a space on the seat 43 of a vehicle, such as a car. The bottom 44 of the receptacle 42 can further include a cushion 50 to increase the comfort for the child within the seat assembly 10.

The seat assembly 10 is attached within the receptacle 42 in the following fashion. The back 46 of the receptacle 42 includes a pair of channels 52 adapted to receive a pair of brackets 54 extending outwardly from the back 18 of the seat 14. A rod 56 extends perpendicularly through the channels 52 and is adapted to support a notch 58 on the bracket 54. Once the notch 58 is supported on the rod 56, the remainder of the bracket 54 is pushed forward into the channel 52 until it locks into place. As best shown in FIG. 6, this occurs when a first end 60 of a retractable locking portion 62 is compressed against a spring 64 by the bracket 54 until the first end 60 is lockingly received within a hole 66 of the bracket 54.

As shown in FIG. 7, in order to remove the seat assembly 10 from the receptacle 42 a knob 68 on the second end 70 of the locking portion 62 is pulled outwardly so that the first end 60 is disengaged from the hole 66 of the bracket 54. In order to maintain a "hands-free" disengagement, the knob 68 can be rotated slightly so that the end of a pin 72 attached to the knob 68 abuts the outer surface of the receptacle 42. Once the seat assembly 10 has been removed from the receptacle 42 the knob 68 can be rotated back to its original position in which the first end 60 is extending into the channel 52.

Alternatively, as shown in FIG. 4 the seat assembly 10 can be used on the seat 43 of a vehicle, without the receptacle 42, by passing the belt 12 through an opening 74 of the bracket 54.

As can be seen, the child restraint seat assembly 10 of the present invention provides a safe and convenient way for securing a child seated on the lap of an adult. The seat assembly 10 is particularly effective in securing a child who must be carried in the lap of a seated adult, such as in airplanes. The child is secured in place by means of straps 20, and the entire seat assembly 10 is then attached to the seat belt 12 of a seated adult. The hinged portion 34 of the loop 32 allows the entire seat assembly 10 and child to be removed from the lap of the seated adult, without removing the seat belt 12 from the adult passenger.

Having described my invention, however, many modifications thereto will become apparent to those skilled in the art to which it pertains without deviation from the spirit of the invention as defined by the scope of the appended claims.

I claim:

1. A child restraint seat assembly comprising:
   a seat having a bottom and a back, said bottom having a from end and a rear end, said back having a top end and a bottom end, said bottom end of said back being joined to said rear end of said bottom, means attached to said seat for removably securing a child within said seat, and means secured to said seat for removably attaching said seat to a seat belt of a vehicle seat, said means secured to said seat for removably attaching said seat to said seat belt comprising a loop directly attached to a post, said post attached to said front end of said bottom of said seat, said loop adapted to slidably engage said seat belt therethrough.

2. The invention of claim 1 wherein said bottom of said seat further comprises a flexible material.

3. The invention of claim 1 wherein said back of said seat is adapted to support the head of a child secured within said seat.

4. The invention of claim 1 wherein said loop is movably attached to said post.

5. The invention of claim 1 wherein said loop further comprises means for releasing said seat belt from within said loop.

6. The invention of claim 1 wherein said seat assembly further comprises a roll bar head protector attached to said top end of said back.

7. The invention of claim 1 wherein said seat assembly is constructed of material capable of floatation.

8. The invention of claim 1 wherein a portion of said seat assembly is constructed of reflective material.

9. The invention of claim 1 wherein said back of said seat further comprises a rigid material.

10. The invention of claim 9 wherein said back of said seat further comprises a padded layer disposed between said top end and said bottom end of said back and adjacent at least one side of said back of said seat.

11. The invention of claim 1 wherein said means attached to said seat for removably securing a child within said seat further comprises at least one elongated strap adapted to secure the body of a child to the seat, said strap further comprising means for removably attaching a portion of said strap to said post attached to said front end of said bottom of said seat.

12. The invention of claim 11 wherein said elongated strap further comprises length adjustment means.

13. The invention of claim 11 and further comprising a chest protector adjacent a portion of said strap.

14. The invention of claim 11 wherein said means for removably attaching a portion of said strap further comprises at least one plate attached to a portion of said strap, and at least one plate receiving member attached to said post, said plate receiving member adapted to removably, lockingly engage said plate.

15. The invention of claim 14 wherein said plate receiving member further comprises plate release means.

16. The invention of claim 1 and further comprising a seat receptacle adapted to removably, lockingly engage said child restraint seat assembly.

17. The invention of claim 16 wherein said seat receptacle further comprises:

a bottom, a back, means for attaching said receptacle to a seat belt, and means for removably, lockingly securing said child restraint seat assembly to said receptacle.

18. The invention of claim 17 wherein said means for attaching said receptacle to a seat belt further comprises a slot in said bottom of said receptacle adapted to receive a seat belt therethrough.

19. The invention of claim 17 wherein said bottom of said receptacle further comprises a cushion.

20. The invention of claim 17 wherein said back of said receptacle further comprises at least one channel adapted to receive at least one bracket extending outwardly from said back of said child restraint seat assembly.

21. The invention of claim 20 wherein said means for securing said seat assembly to said receptacle comprises:

a rod extending perpendicularly through said channel and adapted to engage a notch in said bracket, and an elongated locking portion having a first end, a second end, and a spring therebetween, said first end of said locking portion adapted to lockingly engage a hole in said bracket when said spring is in an elongated first position, and further adapted to disengage said hole when said spring is in a compressed second position.

22. The invention of claim 21 wherein said second end of said locking portion further comprises a knob having an inner side adjacent an outer surface of said back of said receptacle and a pin connected to said inner side of said knob, said pin adapted to abut said outer surface of said back of said receptacle to maintain said spring in said compressed second position.

* * * * *